United States Patent
Didillon et al.

(12) 
(10) Patent No.: US 6,197,721 B1
(45) Date of Patent: Mar. 6, 2001

(54) CATALYSTS FOR USE IN ORGANIC COMPOUND TRANSFORMATION REACTIONS

(75) Inventors: Blaise Didillon, Rueil Malmaison; Denis Uzio, Marly le Roi; Maryline Delage, Rueil Malmaison, all of (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/143,113

(22) Filed: Aug. 28, 1998

(30) Foreign Application Priority Data

Aug. 29, 1997 (FR) .................................................. 97 10878

(51) Int. Cl.$^7$ ................................ B01J 23/40; B01J 23/42
(52) U.S. Cl. ........................ 502/326; 502/327; 502/328; 502/330; 502/332; 502/333; 502/334; 502/335; 502/337; 502/338; 502/339; 585/260
(58) Field of Search ................................ 502/60, 64, 66, 502/67, 71, 73, 74, 77, 78, 79, 185, 325, 326, 337, 338, 339, 327, 328, 330, 332, 333, 334, 335; 208/135, 137, 138; 585/415, 417, 419

(56) References Cited

U.S. PATENT DOCUMENTS

| | | | |
|---|---|---|---|
| 3,625,880 | * 12/1971 | Hamner et al. | 208/111 |
| 3,644,200 | * 2/1972 | Young | 208/120 |
| 3,937,660 | * 2/1976 | Yates et al. | 208/140 |
| 3,981,823 | * 9/1976 | Yates | 252/415 |
| 4,093,643 | * 6/1978 | Vannice et al. | 260/449 M |
| 4,124,487 | * 11/1978 | Tsybulevsky et al. | 208/111 |
| 4,149,998 | * 4/1979 | Tauster et al. | 252/473 |
| 4,325,808 | * 4/1982 | Kim et al. | 208/65 |
| 4,431,574 | * 2/1984 | Bournohville et al. | 502/261 |
| 4,522,928 | * 6/1985 | McVicker et al. | 502/26 |
| 4,581,343 | * 4/1986 | Blanchard et al. | 502/241 |
| 4,680,282 | * 7/1987 | Blanchard et al. | 502/304 |
| 4,684,618 | * 8/1987 | Foley et al. | 502/313 |
| 4,713,363 | * 12/1987 | Hucul | 502/262 |
| 4,762,956 | 8/1988 | Lin et al. | 585/259 |
| 5,118,884 | * 6/1992 | Didillon et al. | 568/875 |
| 5,183,794 | * 2/1993 | Knuuttila et al. | 502/242 |
| 5,210,060 | * 5/1993 | Radlowski et al. | 502/202 |
| 5,235,106 | * 8/1993 | Didillon et al. | 564/417 |
| 5,413,984 | * 5/1995 | Marecot et al. | 502/333 |
| 5,536,695 | * 7/1996 | Blejean et al. | 502/327 |
| 5,540,833 | * 7/1996 | Larsen et al. | 208/137 |
| 5,573,988 | * 11/1996 | Didillon et al. | 502/37 |
| 5,612,274 | * 3/1997 | Wu et al. | 502/325 |
| 5,648,576 | * 7/1997 | Nguyen Than et al. | 585/260 |
| 5,672,801 | * 9/1997 | Didillon | 585/660 |
| 5,853,566 | * 12/1998 | Kraushaar-Czarnetzki et al. | 208/109 |
| 5,889,187 | * 3/1999 | Nguyen Than et al. | 585/260 |

FOREIGN PATENT DOCUMENTS 0 488 514   6/1992   (EP) .
0 549 543   6/1993   (EP) .

* cited by examiner

Primary Examiner—Tom Dunn
Assistant Examiner—Cam N. Nguyen
(74) Attorney, Agent, or Firm—Millen, White, Zelano & Branigan, P.C.

(57) ABSTRACT

A novel catalyst for transforming organic compounds is described. The catalyst is composed of a support selected from refractory oxides such as aluminas, silicas, silica-aluminas or magnesia, used alone or as a mixture, a group VIII metal such as palladium, associated or not associated with another metal, said catalyst being such that the volume of chemisorbed carbon monoxide is greater than or equal to 180 cm$^3$ per gram of metal and has a programmed temperature reduction profile comprising a single hydrogen consumption peak.

22 Claims, 2 Drawing Sheets

Figure 1A:
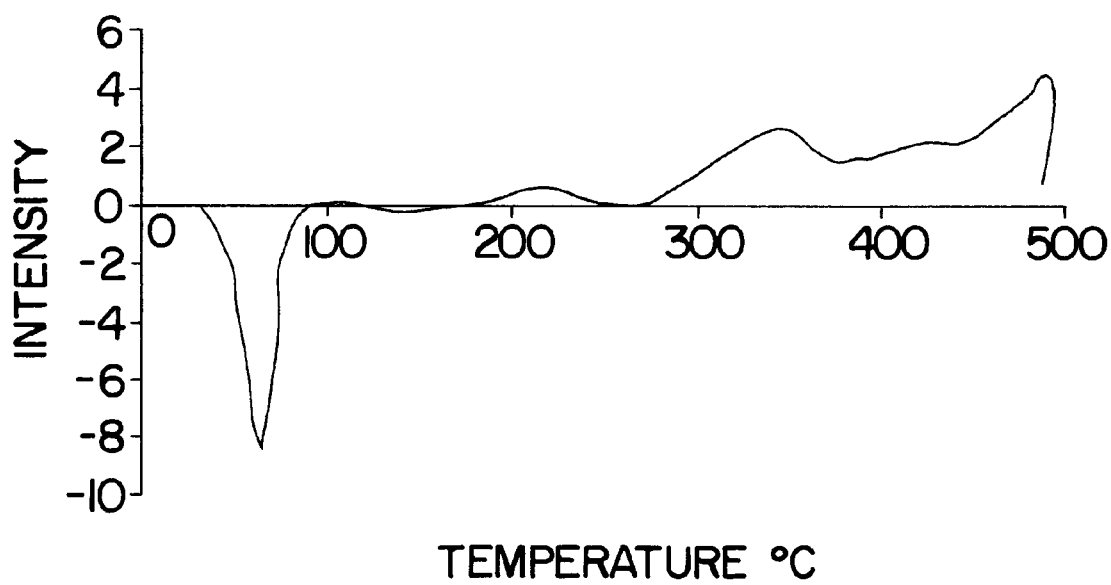

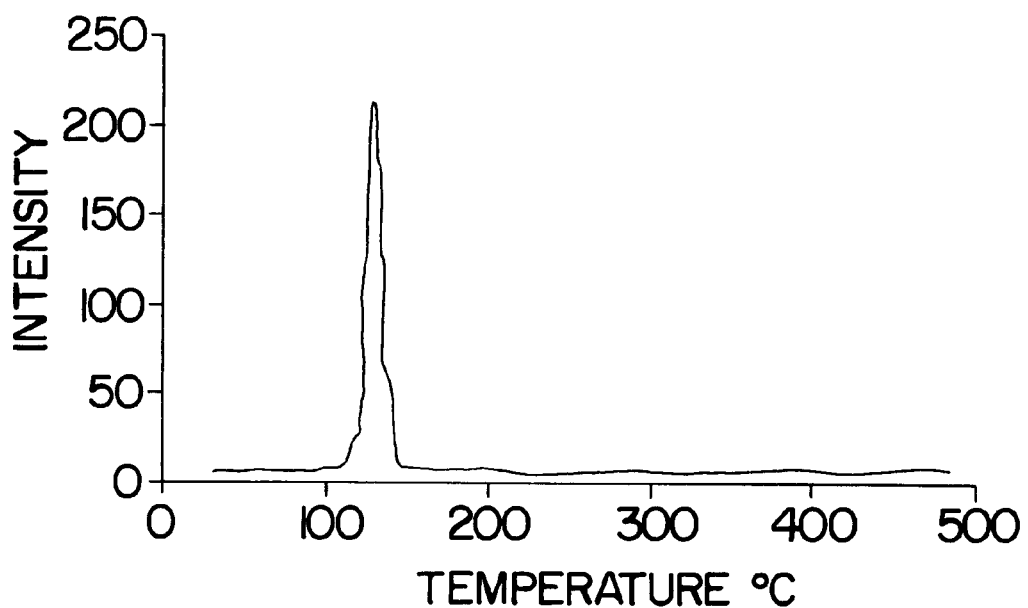
FIG. IC
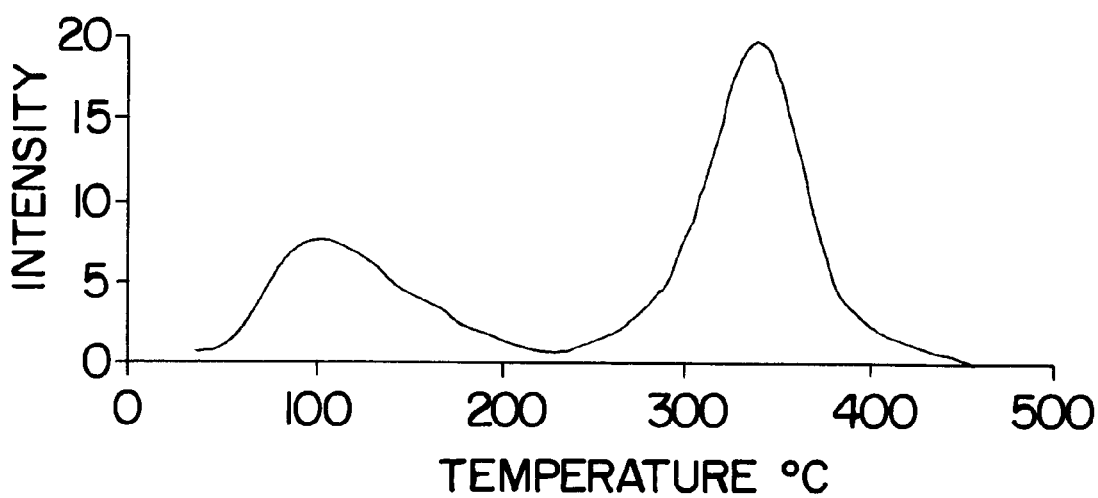
FIG. ID

CATALYSTS FOR USE IN ORGANIC COMPOUND TRANSFORMATION REACTIONS

The present invention relates to a novel catalyst comprising at least one support and at least one metal from group VIII of the periodic table. This catalyst can also contain another metal selected from the group formed by alkali metals and/or a metalloid such as sulphur and/or any other chemical element such as a halogen or a halogenated compound.

Control of the textural characteristics of metal particles deposited on a support has been the subject of numerous studies in the literature and continues to be the centre of interest in recent research. Particle size, for example, is a determining factor when a catalyst is used in a reaction qualified as "structure sensitive" as defined by Boudart. A chemical transformation is termed "structure sensitive" if the reaction rate (or turn over frequency[1]) is dependent on metal crystallite size, in the case of monometallic catalysts, or on the surface composition for bimetallic catalysts. Similarly, the electronic state of the metal constituting the active surface site will set the adsorption energy of the reactants and as a result, the catalytic performances (activity, selectivity and stability). The literature contains many examples of studies aimed at establishing the structure sensitivity or insensitivity of a given reaction: hydrogenation of linear or cyclic alkenes[2][3] on Pt or Pd based catalysts (insensitive reaction), hydrogenation of alkynes and diolefins[4] (sensitive reactions), hydrogenolysis of C—C bonds in paraffin or naphthene compounds[5][6].

[1] The turn over frequency is defined as the rate of reaction reduced to the number of surface metal atoms.
[2] J. C. Schlatter, M. Boudart, J. Catal., 24, 1972, 482.
[3] M. Boudart, W. C. Cheng, J. Catal., 106, 1987, 134.
[4] S. Hub, L. Hilaire, R. Touroude, Appl. Catal. 36, 1992, 307.
[5] J. Barbier, P. Marecot, Nouv. J. Chim. 5, 1981, 393.
[6] J. R. Anderson, Y. Shymoyama, Proc 5$^{th}$ Int. Cong. Catal., Palm Beach, 1972, North Holland Publ. Co/Amer. Elsevier, Vol 1, 1973, 55.

The formulation of catalysts used in hydrocarbon conversion processes has formed the subject of a large number of studies. Supported metal catalysts containing a metal phase based on palladium or nickel supported on a refractory oxide type support such as alumina are currently used in gasoline hydrogenation reactions, for example.

For reactions termed structure sensitive reactions, the protocol for preparing the catalysts is particularly important and aimed at obtaining an optimum size for the metal particles corresponding to the maximum reaction rate. Thus in the case of the selective hydrogenation of butadiene, the most active catalyst must contain particles of about 40 Å.

However, the "structure sensitive" nature of a reaction imposing a set particle size which is in general relatively large (several tens of Angströms) substantially limits the metal surface exposed per unit mass of metal, limiting the catalytic activity as a result.

The present invention shows that it is possible to prepare catalysts containing at least one metal from group VII of the periodic table of the elements which perform particularly well. The size of the metal particles is generally below 10 Å, which means that the majority of the metal atoms deposited on the support are exposed to the reactants. These catalysts are characterized by volumes of chemisorbed CO of at least 180 cm$^3$ per gram of metal, corresponding to a dispersion[7] of 80% or more. Characterization by programmed temperature reduction (PTR) of this type of catalyst produces a single hydrogen consumption peak centred on a range of temperature of 50° C. to 300° C. (preferably 100° C. to 200° C.). Hydrogen salting-out is not observed at low temperatures (about 70° C.), salting-out generally being associated with the formation of metal hydrides and characterized in PTR by an intense hydrogen production signal at about T=70° C.

[7] Metallic dispersion is defined as the ratio of the number of metal atoms exposed on the surface to the total number of metal atoms.

The volume of chemisorbed carbon monoxide is generauy measured using the following procedure: after treatment at 200° C. in a stream of hydrogen for 2 hours, then in helium for 2 hours, it is allowed to cool down to ambient temperature, keeping it in helium, before injecting a known volume of CO. The CO consumption is followed by gas phase chromatography.

The PTR analysis procedure is based on measuring the quantity of hydrogen consumed by reduction of the metallic phase as a function of temperature. The PTR profile obtained thus shows the intensity of reduction as a function of temperature. Integrating the reduction peaks gives the quantity of hydrogen consumed. The procedure includes in-situ re-oxidation, generally by prior calcining at 200° C. for two hours with a temperature rise of 5° C./min. After re-oxidation, the samples are reduced, from ambient temperature up to 900° C., by increasing the temperature at 5° C./min in a gas stream constituted by 5% hydrogen and 95% argon, injected at a flow rate of 20 cm$^3$/min.

Another characterization technique for characterizing the nature of the interactions between the metal and the support consists in EXAFS (for "Extended X-ray Absorption Fine Structure). In fact, this spectroscopic technique enables the direct determination (in terms of nature and number) of the elements located in the vicinity of a given element. It is thus possible to know the environment of the metal deposited by any preparation method.

The hydrocarbon conversion processes for which the catalysts of the invention are applicable operate at a temperature in the range 10° C. to 800° C. and at a pressure in the range 0.1 to 10 HPa.

More particularly, the catalysts of the present invention are applicable:

- to catalytic purification of olefin cuts by selective hydrogenation. The conditions generally used for this type of transformation are an average temperature in the range from 25° C. to 200° C., a pressure in the range 0.1 to 10 MPa and a molar ratio of hydrogen to hydrocarbons in the range 1 to 150. The feed is generally a steam cracking, cut containing 5 to 12 carbon atoms per molecule;
- to catalytic hydrogenolysis processes carried out in the range 400° C. to 800° C., at a pressure in the range 0.1 to 2 MPa and with a molar ratio of hydrogen to hydrocarbons of 0 to 20;
- to hydrogenation processes for hydrocarbons containing alkyne, diene or olefin functions, or aromatic functions, under conditions which are known to the skilled person, more particularly an average temperature in the range 10° C. to 400° C. and at a pressure in the range 0.1 to 10 MPa; and
- to processes for hydrogenation of organic functions such as aldehyde, ketone, ester, acid or nitro functions, under conditions which are known to the skilled person, more particularly an average temperature in the range 10° C. to 500° C. and at a pressure in the range 0.1 to 10 MPa.

The support for the catalyst of the invention comprises at least one refractory oxide which is generally selected from oxides of metals from groups IIA, IIIA, IVB and IVA of the periodic table of the elements, such as magnesium, aluminum, silicon, titanium, zirconium or thorium oxides, used alone or as a mixture or mixed with oxides of other metals from the periodic table. Activated carbon can also be used. Type X, Y, mordenite, faujasite, ZSM-5, ZSM-4, ZSM-8, etc. type zeolites or molecular sieves, also mixtures of metal oxides from groups IIA, IIIA, IVB and/or IVA with a zeolitic material can also be used.

For hydrocarbon transformation reactions, the preferred support is alumina, with a specific surface area which is advantageously in the range 5 to 400 $m^2$/gram, preferably in the range 5 to 150 $m^2$/gram.

Preferred supports used for transforming organic functions are silica, carbon and alumina.

In the catalyst of the invention, the group VIII metal is usually selected from iridium, nickel, palladium, platinum, rhodium and ruthenium. Platinum and palladium are the preferred metals for the hydrocarbon conversion reactions. Rhodium and ruthenium are the preferred metals for transforming functional molecules (fine chemicals). The percentage by weight is selected so as to be between 0.01% and 10%, preferably between 0.1% and 5%. The catalyst can also contain an additional element selected from the group formed by alkali metals, alkaline-earth metals and metalloids (such as sulphur). The percentage by weight is selected so as to be between 0.01% and 10%, preferably in the range 0.02% to 5%.

The catalyst can be prepared by different procedures for impregnating the support and the invention is not limited to a particular impregnation procedure. When a plurality of solutions is used, intermediate drying and/or calcining can be carried out.

The catalytic metal precursor can be selected from the group formed by formed by the hydroxide, halogenated compounds, nitrate, acetate and chloride of the metal under consideration.

In a preferred preparation technique of the invention, the catalyst is obtained by impregnating the support using an aqueous solution of at least one group VIII metal compound, the volume of the solution corresponding to the retention volume of the support. The impregnated support is then dried and calcined in air, normally between 100° C. and about 500° C., then reduced in hydrogen at a temperature which is normally in the range from about 100° C. to about 600° C., preferably in the range from about 150° C. to about 300° C.

This reduction can be carried out immediately after calcining, or later at the user's location. It is also possible to directly reduce the dried products at the user's location.

The complete description of all applications, patents and publications cited above and below, and of the corresponding French application 97/10878, filed on Aug. 29$^{th}$ 1997, is hereby included by reference in the present description.

The following examples illustrate the invention without in any way limiting its scope.

EXAMPLE 1 (reference)

A catalyst A was prepared by impregnating an alumina support with a palladium nitrate solution. This support was in the form of 2 to 4 mm diameter beads. It had a specific surface area of 65 $m^2$/g and its pore volume was 0.6 ml/g. After impregnation, the catalyst was dried at 120° C. and calcined at 450° C. The palladium content of catalyst A was 0.3% by weight.

EXAMPLE 2 (in accordance with the invention)

A catalyst B was prepared by impregnating an alumina support with a solution containing palladium nitrate and sodium nitrite. This support was in the form of 2 to 4 mm diameter beads. It had a specific surface area of 139 $m^2$/g and its pore volume was 1.05 ml/g. After impregnation, the catalyst was dried at 120° C. and calcined at 200° C. The palladium content of catalyst B was 0.3% by weight.

EXAMPLE 3 (in accordance with the invention)

A catalyst C was prepared by impregnating an alumina support with a solution containing palladium nitrate and sodium nitrite. This support was in the form of 2 to 4 mm diameter beads. It had a specific surface area of 39 m/g and its pore volume was 0.57 ml/g. After impregnation, the catalyst was dried at 120° C. and calcined at 200° C. The palladium content of catalyst C was 0.3% by weight.

EXAMPLE 4 (reference)

A catalyst D was prepared by impregnating an alumina support with an excess of a solution of palladium acetylacetonate in toluene. This support was in the form of 2 to 4 mm diameter beads. It had a specific surface area of 39 $m^2$/g and its pore volume was 0.57 ml/g. After impregnation, the catalyst was washed with a toluene solution then dried at 120° C. and calcined for 2 hours at 450° C. in a stream of air. The palladium content of catalyst D was 0.3% by weight.

EXAMPLE 5 (reference)

Example 4 was repeated, with using an alumina support having a specific surface area of 139 $m^2$/g. Catalyst E was obtained.

EXAMPLE 6

For the 5 catalysts A to E, the volumes of chemisorbed CO was determined using a dynamic procedure at 20° C. The volumes of chemisorbed CO shown in Table 1 are expressed in $cm^3$/g of Pd.

TABLE 1

| | Values of chemisorbed CO volumes | | | | |
|---|---|---|---|---|---|
| Catalyst | A | B | C | D | E |
| Volume of CO $cm^3$/g Pd | 70 | 230 | 190 | 199 | 200 |

Figure 1B:
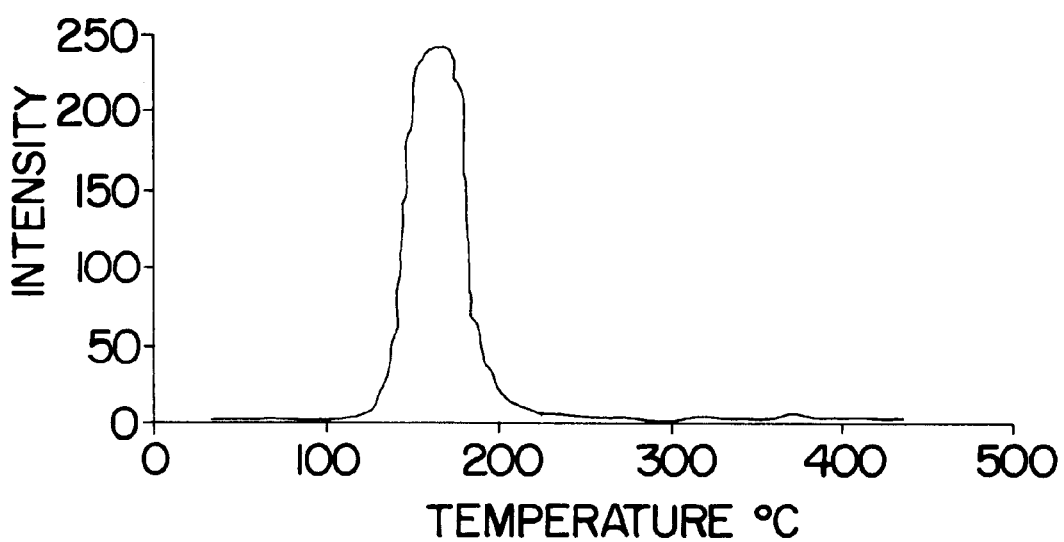

PPTR analysis of catalysts A, B, C and D was carried out using the protocol described above. FIGS. 1A to 1D show the Programmed Temperature Reduction profiles for catalysts A, B, C and D.

The PTR profiles for catalysts B and C were in accordance with the invention and exhibited:

a single "low temperature" reduction peak (T<300° C.);

the absence of hydrogen production linked to decomposition of palladium hydrides.

In contrast, the catalysts with reference numbers A and D exhibited a plurality hydrogen consumption signals at least one of which was at a temperature of over 300° C. The PTR profile of catalyst A also contained a hydrogen production peak at a temperature close to 70° C.

Catalyst E showed a PTR profile analogous to that of catalyst D.

EXAMPLE 7

The characterization by EXAFS of catalysts B and E showed, for catalyst E, the presence of oxygen in the near environment of the palladium (first neighbour), whereas, for catalyst B, the palladium is surrounded only by other palladium atoms. These oxygene atoms, which can only be provided by the alumina support, indicate that there is a link (hence, a rather strong interaction) between palladium present on catalyst E and its support. By contrast, an analogous reasoning shows that there is no (or little) interaction between the palladium present on catalyst B and its support. This distinction could be attributed to the differences in the preparation techniques used.

EXAMPLE 8

The hydrogenating properties of catalysts A to E were evaluated using a perfectly stirred "Grignard" type batch test. Two grams of palladium based catalyst were reduced for 2 hours at 200° C. in a stream of hydrogen, then transferred to the hydrogenation reactor under an inert gas. The feed to be hydrogenated was a mixture containing 12 g of a diolefin (1,3-butadiene) diluted in 180 cm$^3$ of n-heptane (in this hydrogenation, 1,3-butadiene is converted to 1-butene). The test temperature was kept at 20° C. and the pressure at 1 MPa. The results are shown in Table 2. The hydrogenating activity is expressed in mol. min$^{-1}$. g Pd.

TABLE 2

Catalytic performances for 1,3-butadiene hydrogenation

| Catalyst | A | B | C | D | E |
|---|---|---|---|---|---|
| Activity (mol.min$^{-1}$ g Pd$^{-1}$) cm$^3$/g Pd | 4.25 | 8.75 | 6.35 | 1.6E-03 | 2.0E-01 |
| Selectivity, % of 1-butene at 80% of butadiene conversion | 59 | 55 | 58 | 60 | 59 |

Catalyst B was twice as active as reference catalyst A, while a high selectivity to 1-butene is maintained.

For the same support and similar volumes of chimisorbed CO per gram of palladium, the activity of catalyst B is markedly higher than that of catalyst E (x44) and the activity of catalyst C is considerably higher than that of catalyst D (x4000).

EXAMPLE 9

The hydrogenating properties of catalysts A, B and E were evaluated using a perfectly stirred "Grignard" type batch test. Two grams of palladium based catalyst were reduced for 2 hours at 200° C. in a stream of hydrogen, then transferred to the hydrogenation reactor under an inert gas. The feed to be hydrogenated was a mixture containing 13 g of phenylacetylene diluted in 180 cm$^3$ of n-heptane (in this hydrogenation, phenylacetylene is converted to styrene). The test temperature was kept at 17° C. and the pressure at 1 MPa. The results are shown in Table 3. The hydrogenating activity is expressed in mol. min$^{-1}$. g Pd$^{-1}$.

TABLE 3

Catalytic performances for phenylacetylene hydrogenation

| Catalyst | A | B | E |
|---|---|---|---|
| Activity (mol.min$^{-1}$ g Pd$^{-1}$) | 1.15 | 1.29 | 0.3 |
| Selectivity, % of styrene at 80% of phenylacetylene conversion | 97.5 | 96 | 95 |

In this case too, the specific activity of catalyst B was higher than that of reference catalysts A and E, while a high selectivity to styrene was maintained.

The above examples can be repeated with analogous results by substituting the general or particular reactants and/or conditions described in the invention for those used in these examples.

The above description will enable the skilled person to readily determine the essential characteristics of the invention and, without departing from the spirit and scope thereof, to make a variety of changes or modifications to adapt it to a variety of uses and implementation conditions.

What is claimed is:

1. A catalyst comprising a support and an active phase, wherein the support comprises carbon at least one zeolite, or at least one refractory oxide and,
    wherein the active phase comprises at least one metal from group VIII of the perodic table of the elements,
    wherein the metal has a dispersion of at least 80%, and wherein said catalyst exhibits a programmed temperature reduction profile comprising a single hydrogen consumption peak at a temperature range of from 50° C. to 300° C.

2. A catalyst according to claim 1, wherein said support comprises at least one refractory oxide selected from oxides of metals from groups IIA, IIIA, IVB and IVA of the periodic table, used alone or as a mixture, or mixed with oxides of other metals from the periodic table.

3. A catalyst according to claim 2, wherein the at least one refractory oxide is an oxide of magnesium, aluminum, silicon, titanium, zirconium, or thorium.

4. A catalyst according to claim 2, wherein the metal from group VIII of the periodic table is iridium, nickel, palladium, platinum, rhodium or ruthenium, in a percentage in the range 0.01% to 10%.

5. A catalyst according to claim 4, further comprising at least one additional element in the active phase of the catalyst in a percentage in the range 0.01 % to 10%, wherein the additional element is selected from the group consisting of alkali metals, alkaline-earth metals and metalloids.

6. A catalyst according to claim 1, wherein said support comprises carbon.

7. A catalyst according to claim 6, wherein the metal from group VIII of the periodic table is iridium, nickel, palladium, platinum, rhodium or ruthenium, in a percentage in the range 0.01% to 10%.

8. A catalyst according to claim 7, further comprising at least one additional element in the active phase of the catalyst in a percentage in the range 0.01% to 10%, wherein the additional element is selected from the group consisting of alkali metals, alkaline-earth metals and metalloids.

9. A catalyst according to claim 1, wherein said support comprises at least one molecular sieve selected from the group consisting of X zeolite, Y zeolite, inordenite, faujasite, ZSM-5 zeolite, ZSM-4 zeolite, and ZSM-8 zeolite.

10. A catalyst according to claim 9, wherein said support further comprises at least one oxide of a metal from groups IIA, IIIA, IVB and IVA of the periodic table.

11. A catalyst according to claim 9, wherein the metal from group VIII of the periodic table is iridium, nickel, palladium, platinum, rhodium or ruthenium, in a percentage in the range 0.01% to 10%.

12. A catalyst according to claim 11, further comprising at least one additional element in the active phase of the catalyst in a percentage in the range 0.01% to 10%, wherein the additional element is selected from the group consisting of alkali metals, alkaline-earth metals and metalloids.

13. A catalyst according to claim 1, wherein the metal from group VIII of the periodic table is iridium, nickel, palladium, platinum, rhodium or ruthenium, in a percentage in the range 0.01 % to 10%.

14. A catalyst according to claim 13, further comprising at least one additional element in the active phase of the catalyst in a percentage in the range 0.01% to 10%, wherein the additional element is selected from the group consisting of alkali metals, alkaline-earth metals and metalloids.

15. A catalyst according to claim 1, further comprising at least one additional element in the active phase of the catalyst in a percentage in the range 0.01% to 10%, wherein the additional element is selected from the group consisting of alkali metals, alkaline-earth metals and metalloids.

16. In a process comprising subjecting an olefinic cut to selective hydrogenation in contact with a catalyst, the improvement wherein the catalyst is in accordance with claim 1.

17. A process according to claim 16 in which a feed consisting essentially of a hydrocarbon cut from a steam cracker containing 5 to 12 carbon atoms per molecule is treated at an average temperature in the range 25° C. to 200° C., at a pressure in the range 0.1 to 10 MPa and with a molar ratio of hydrogen to hydrocarbons in the range 1 to 150.

18. A process according to claim 16, in which the catalyst used has an alumina support the specific surface area of which is in the range 5 to 400 $m^2$ per gram and which comprises platinum and/or palladium as the group VIII metal.

19. A catalytic hydrogenolysis process comprising conducting the hydrogenolysis at a temperature in the range 400° C. to 800° C., at a pressure in the range 0.1 to 2 MPa with a molar ratio of hydrogen to hydrocarbons in the range 0 to 20, and in contact with a catalyst according to claim 1.

20. A process for hydrogenating hydrocarbons containing alkyne, diene or olefin functions, or aromatic functions, comprising conducting the hydrogenation at an average temperature in the range 10° C. to 400° C. and at a pressure in the range 0.1 to 10 MPa, and in contact with a catalyst according to claim 1.

21. A process for hydrogenating aldehyde, ketone, ester, acid or nitro functions, comprising conducting the hydrogenating at an average temperature in the range 10° C. to 500° C. and at a pressure in the range 0.1 to 10 MPa, and in contact with a catalyst according to claim 1.

22. A process according to claim 21, in which the catalyst has a silica, carbon or alumina support and comprises rhodium and/or ruthenium as the group VIII metal.

* * * * *

UNITED STATES PATENT AND TRADEMARK OFFICE
CERTIFICATE OF CORRECTION

PATENT NO. : 6,197,721 B1　　　　　　　　　　　　　　　　　　　　　　　Page 1 of 1
DATED : March 6, 2001
INVENTOR(S) : Didillon et al.

It is certified that error appears in the above-identified patent and that said Letters Patent is hereby corrected as shown below:

<u>Column 6,</u>
Line 50, delete "inordenite" and replace with -- modernite --.

Signed and Sealed this

Twenty-second Day of January, 2002

Attest:

JAMES E. ROGAN
*Attesting Officer*　　　　　　　*Director of the United States Patent and Trademark Office*